US008015200B2

(12) United States Patent
Seiflein et al.

(10) Patent No.: US 8,015,200 B2
(45) Date of Patent: Sep. 6, 2011

(54) MULTIMEDIA PLATFORM SYNCHRONIZER

(76) Inventors: Phil Seiflein, Ojai, CA (US); Dawud Davis, Qcnard, CA (US)

( * ) Notice: Subject to any disclaimer, the term of this patent is extended or adjusted under 35 U.S.C. 154(b) by 720 days.

(21) Appl. No.: 11/467,152

(22) Filed: Aug. 24, 2006

(65) Prior Publication Data

US 2009/0100092 A1     Apr. 16, 2009

Related U.S. Application Data

(60) Provisional application No. 60/753,565, filed on Dec. 24, 2005.

(51) Int. Cl.
*G06F 17/30* (2006.01)
*G06F 7/00* (2006.01)

(52) U.S. Cl. .............. 707/769; 84/610; 84/622; 84/626; 369/1; 386/248; 386/280; 386/285; 707/781; 707/812; 707/913

(58) Field of Classification Search .................. None
See application file for complete search history.

(56) References Cited

U.S. PATENT DOCUMENTS

| | | | | |
|---|---|---|---|---|
| 5,811,707 A * | 9/1998 | Kakehashi et al. | ............. | 84/610 |
| 7,316,032 B2 * | 1/2008 | Tayebi et al. | ................... | 705/51 |
| 7,408,106 B2 * | 8/2008 | Weiner et al. | ................... | 84/610 |
| 7,528,890 B2 * | 5/2009 | Staker et al. | ................... | 348/592 |
| 7,577,940 B2 * | 8/2009 | Amin et al. | .................... | 717/120 |
| 7,840,437 B2 * | 11/2010 | Lewis | ........................ | 705/14.26 |
| 2003/0081934 A1 * | 5/2003 | Kirmuss | ......................... | 386/46 |
| 2003/0212804 A1 * | 11/2003 | Hashemi | ...................... | 709/228 |
| 2004/0068536 A1 * | 4/2004 | Demers et al. | ............... | 709/201 |
| 2004/0205648 A1 * | 10/2004 | Tinsley et al. | ................. | 715/530 |
| 2004/0243482 A1 * | 12/2004 | Laut | ................................ | 705/27 |
| 2004/0267940 A1 * | 12/2004 | Dideriksen et al. | ............. | 709/228 |
| 2006/0013563 A1 * | 1/2006 | Adolph et al. | .................. | 386/95 |
| 2006/0152622 A1 * | 7/2006 | Tan et al. | ....................... | 348/473 |
| 2007/0100768 A1 * | 5/2007 | Boccon-Gibod et al. | ....... | 705/59 |

* cited by examiner

*Primary Examiner* — Greta L Robinson
*Assistant Examiner* — James J Wilcox
(74) *Attorney, Agent, or Firm* — Klarquist Sparkman, LLP

(57) ABSTRACT

A karaoke home entertainment center for streamlining karaoke show; reduce stress, problems and time pressure on the KJ & to prevent piracy. The inventive device includes Ultimate Karaoke Book, Karaoke Rental Systems, ProPlayer, Karaoke Shoppe Download Center, Karaoke Burning Station, Downloadable Karaoke CD+G Player, Video Library Pro, DRM and Licensing encryption engine, Pre-manufactured CD DRM. The Book eliminates the majority of KJ typing when creating or updating their book. Book with minimal player forms the Karaoke Rental System. ProPlayer incorporates super encryption Dongle or soft encryption, which permits "back-up" copy but can only be used with the original dongle. Karaoke Shoppe Download Center consists of basic computer system that can access our on-line database or come pre-loaded with encrypted songs. Karaoke burning Station Kiosk is either counter-top or stand-alone kiosks that can contain and deliver cds. Downloadable Karaoke CD+G Player is a quality karaoke player that doesn't require a special piece of hardware (other than a personal computer). It can download and play karaoke songs and be given away for free. Video Library Pro is an adaption of the book and player above designed for video professionals. There are two forms of DRM and Licensing encryption engine that perform the function of file protection. Together they form the Karaoke Home Entertainment Center.

15 Claims, 2 Drawing Sheets

MULTIMEDIA PLATFORM SYNCHRONIZER

CROSS REFERENCE TO RELATED APPLICATION

This application claims the benefit of priority of U.S. Provisional Patent Application No. 60/753,565, filed on Dec. 24, 2005, which is hereby incorporated by reference in its entirety.

BACKGROUND OF THE INVENTION

1. Field of the Invention

The present invention relates generally to karaoke systems and more specifically it relates to a karaoke home entertainment center to streamline karaoke show; reduce stress, problems and time pressure on the Karaoke Jockey (KJ) & to prevent piracy.

Existing products commonly found in the marketplace include typical media players are usually format isolated because of the proprietary nature of their creators. i.e., MS Media Player, Apple I-tunes.

2. Description of the Related Art

It can be appreciated that karaoke systems have been in use for years. The main problem with conventional karaoke systems are stress, problems and time pressure on the KJ. Another problem with conventional karaoke systems is piracy.

The main problem with existing products is that additionally, these systems are likely to be complete into themselves and do not permit expansion into a larger system or more complex use through the use of plug-ins.

Another problem with existing products is current displays of closed captioning are normally super-imposed typed text that lingers behind the actual spoken words.

Another problem with existing products is DRM is normally embedded into a cd or dvd disk and raw digital file are sometimes enveloped with a file i.d. Watermarks are burned into the video display of the file and are not removable.

While these devices may be suitable for the particular purpose to which they address, they are not as suitable for streamlining the karaoke show; reducing stress, problems and time pressure on the KJ & preventing piracy.

In These respects, the karaoke home entertainment center according to the present invention substantially departs from the conventional concepts and designs in so doing provides an apparatus primarily developed for the purpose of streamlining karaoke shows; reducing stress, problems and time pressure on the KJ & preventing piracy.

SUMMARY OF THE INVENTION

In view of certain disadvantages inherent in the known types of karaoke systems, the present invention provides a new karaoke home entertainment center construction wherein the same can be utilized to streamline karaoke show; reduce stress, problems and time pressure on the KJ & to prevent piracy.

The general purpose of the present invention, which will be described subsequently in greater detail, is to provide a new karaoke home entertainment center that has many of the advantages of the existing karaoke systems and many novel features that result in a new karaoke home entertainment center which is not anticipated, rendered obvious, suggested, or even implied by any of the existing karaoke systems, either alone or in any combination thereof.

In particular, the present invention relates to a system for identifying a format file ending, activating a plug-in that will play said format and join that file content with other attachments such as closed-captioning, pre-programmed visual effects drm, encryption, or any other modality that can be attached to the file and played synchronously.

A cross-platform software based media player receives a file by download from the interne, or any other means, the player-engine within the software identifies what format the media is in by identifying the file ending. With this information the engine activates both a plug-in to play the file and a multi-layered system file that will enjoin and play its content with the identified file.

This multi-tiered file joining allows for almost unlimited file manipulation; for example, attachment of closed captioned words to song or video files. Audio can be added to text files and color, heat or any other sensory signal can be attached to the file for digital activation of a sensory producing device.

The file system structure allows for continuous expansion because of the use of plug-ins that can be adapted to work with the core system.

To attain this, the present invention generally comprises of:
Ultimate Karaoke Book (The Book)
Karaoke Rental System
ProPlayer
Karaoke Shoppe Download Centre
Burning Station
Downloadable Karaoke CD+G Player
Video Library Pro
Universal Player
File Plug In Player.

The Book has a computer program that eliminates the majority of KJ typing when creating or updating their book. The Book with minimal player becomes the Karaoke Rental System. The ProPlayer incorporates super encryption Dongle or soft encryption, which permits "back-up" copy but can only be used with the original dongle. Karaoke Shoppe Download Center consists of a computer system that can access our on-line database or come pre-loaded with encrypted songs. Karaoke Burning Station is made of counter-top and Stand-alone Kiosks that can contain and deliver cds. Downloadable Karaoke CD+G Player consists of a quality karaoke player that doesn't require a special piece of hardware (other than a personal computer) that can download and play karaoke songs and be given away for free. Video Library Pro is an adaptation of the Book and player above designed for video professionals. There are two forms of DRM and Licensing encryption engine that perform the same function: file protection. One is by use of a dongle that prohibits the use of the program without the dongle's security code being present on that computer. The other is from our "Double-Barrelled" software encryption that is built into each of our players. Pre-Manufactured CD DRM form of encryption applies to cd's manufactured enmass at a production facility.

There has thus been outlined, rather broadly, the more important features of the invention in order that the detailed description thereof may be better understood, and in order that the present contribution to the art may be better appreciated. There are additional features of the invention that will be described hereinafter.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

Multi-layered digital files allow for enhanced user experience through multitasking and multi-performance within any digital file. It is a primary object of the present invention to provide a file structure that can join many functions into one file; i.e., accurately align closed-captioning to video and sound files, incorporate Digital Rights management and encryption, timed trail deactivation and watermarking, and audio-visual reference to text files.

Another object of the present invention is to allow additional feature add-on by use of plug-ins which increase the scope and use of the application.

The present invention plays files from multiple formats and provides a complete digital media storage and playback system Other objects and advantages of the present invention will become obvious to the reader and it is intended that these objects and advantages are within the scope of the present invention.

DETAILED DESCRIPTION OF THE INVENTION

The Book

The Book has computer program that eliminates the majority of KJ typing when creating or updating their book. There is a database with approx. 160,000 song titles, inclusive of manufacturer's song numbering. So all the KJ had to do is "Click" on titles he wishes to enter and the computer enters the info. This means, instead of typing every new song he has into the computer, the data base does the work for him by having the data pre-loaded. The data is searchable by artist and title so singers can easily access it, select songs and print a mistake proof slip eliminating the need for show re-starts because of wrong song numbers. Additionally a search can be done by entering a "keyword". The artist, title and genre data bases can also be scrolled up and down when they are on the screen.

Figure 2:
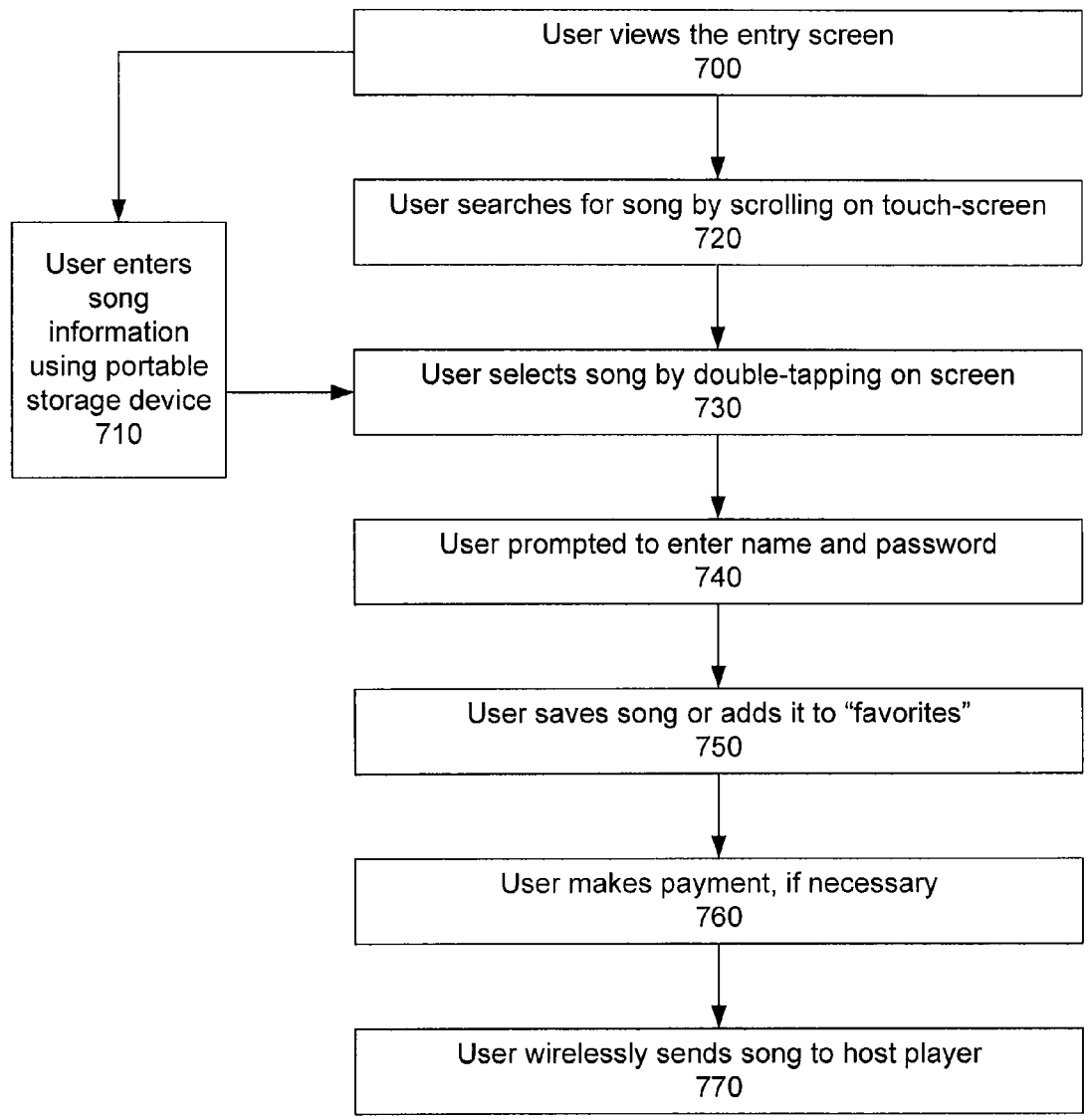
FIG. 2 illustrates an embodiment for sending song selections to a host player.

SONG SLIP SELECTIONS: As illustrated in FIG. 2, a user views the entry screen (700) which gives a choice of search by artist, search by title (720) or open "Personal Folder", or "New Releases" or "Personal CD" (710). For example, if "artist" is chosen, then the next screen appears with a listing of all the artists names in the database. User then either scrolls (720) down the name listings until the name he wants is highlighted or he types in the name of the artist on the screen keyboard. The screen keyboard is specially placed for user ease of hand use and color coded for ease of viewing. If the name of the artist is in the database it appears on the screen highlighted. User double taps (730) the name and then a full selection of that artist's songs appear in a window. Next to that window is a scroll bar that allows the user to scroll up and down to find the song they want. At the top of the scroll bar is a window that indicates the total number of that artist songs and the number of the song the user is currently viewing. There is also a bar that allows instant access to any part of the library by tapping on a relative position on a thermometer icon. A third window on the page indicates the name of the label that manufactured the current listed song along with all other available manufactured versions. If head phones are plugged into the computer, user can listen to a sample of that song.

When user has the song they want they can either save it to "favorites file" (750), or add the song to their song slip, in which case a button flashes "Sign in". When tapped, a new screen appears and prompts the user to sign in by using a screen keyboard. When he types in his name and presses an "Add Song" button a screen prompt asks if he wants to "Print Slip" or "Add another song to Slip" If he chooses to add another song, the process is repeated with the exception of no further request for name entry as it is already on the slip. When he chooses "Print Slip" or "Send Slip" (for the wireless unit) the slip is printed out on a thermal printer with notations of time entered, name of song and artist, song number, manufacturer of song.

User may "View Slip" at any time during this process by tapping a button on the mam screen.

From the View Slip page user can move chosen entries up or down in their order simply by tapping an up or down button after highlighting that entry.

From the View Slip page User can nominate a change of key in a selected song by tapping a plus or minus key change button at the bottom of that page. "Send Slip" is the button used for a wireless configuration when this Book is used in combination with the ProPlayer. It sends the selected song information directly to the Hosts computer without any paper usage (770).

PERSONAL FOLDER: There is a personal folder which allows singers to keep a personal file of the song versions they like and key.

When a user enters the program via this option he signs in with his name and a password (740). Then a file with all the songs he has added to this file appears. He still has all the other search capabilities available to him, he just doesn't have to sign in again. This option also permits singer to store entire songslips and reprint them or send them.

The original design of this system included an Industrial-strength cased touchscreen computer, single or dual screen. It was adapted to run up to 8 screens off of one server. Higher numbers of screens may be possible but have not been tested.

The song titles in any particular Host database can be listed on the Host internet site. Users can view that book from any location and submit songs prior to coming to the show via Net Selection and entry.

Figure 1:
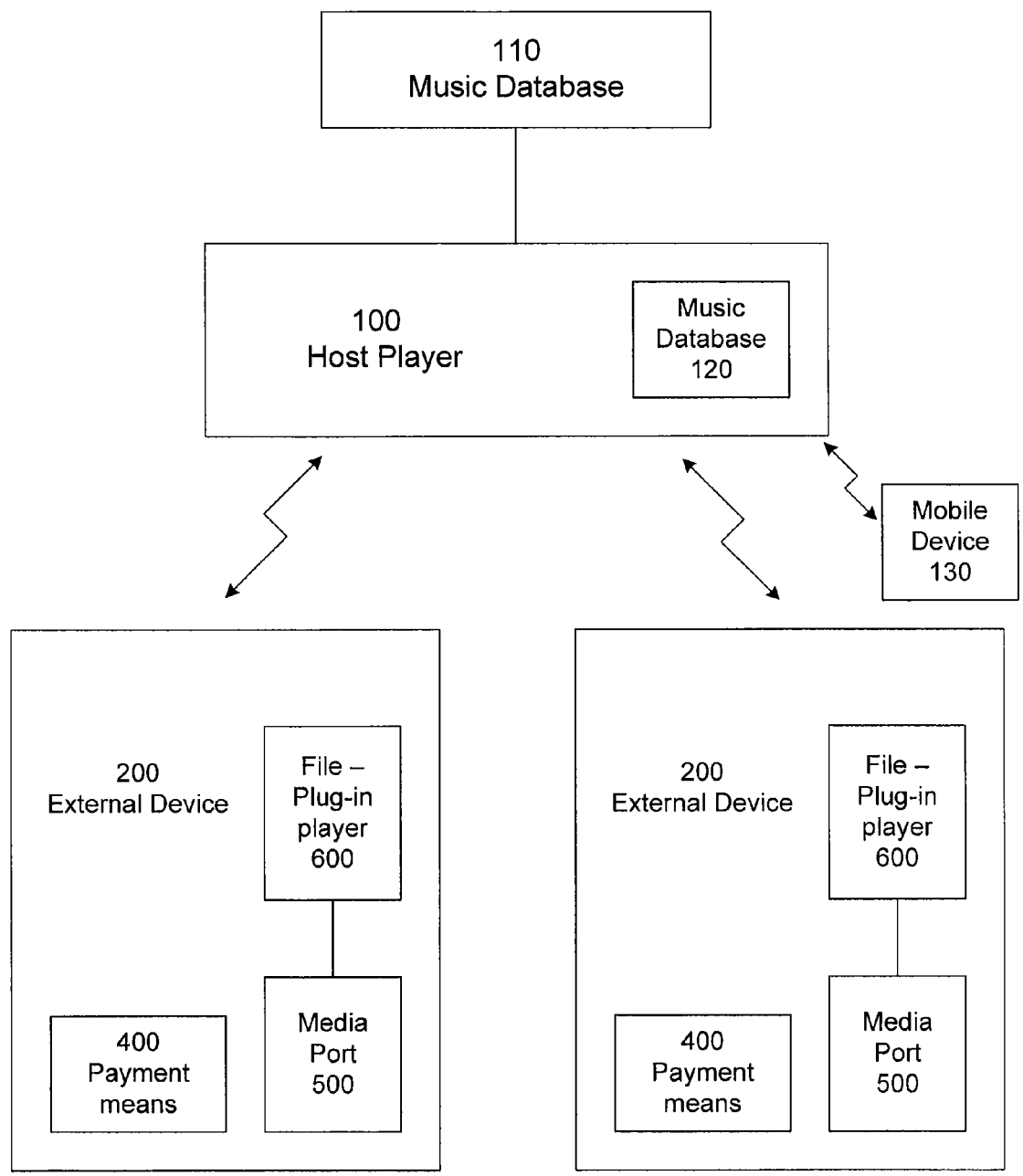
FIG. 1 illustrates an embodiment in which a host player can be accessed by one or more external devices.

As shown in FIG. 1, adaptations to access the host database and song selection include the use of any wired or wireless device, for example, tablet pc's, pda's or cell phones (130).

ADMINISTRATION: This program comes with several vital administrative functions and a database of over 160,000 song titles of karaoke songs and cd's made up to 2002, which allow the administrator to simply click the songs for an entire cd or select particular songs from the list given. Those selected are automatically entered into the Book, without having to type the entries. This database is capable of receiving additional entries from other database programs that keep a current listing of cd's in production.

PRINT BOOK: Administrator has the option of printing a book by title or artist. Also, Administrator can save favored playlist by name or genre.

BAR CODE: Administrator can set a bar code manually or automatically. This function will generate a code (for the day) that prevents those without it from printing a slip.

VIEWER TIME SET: Administrator can set the amount of time one can stare at a page before the program resets itself.

SLIP SONG LIMIT: Administrator can set the number of songs allowed to be entered at one time.

AWARD NOTIFICATION: Administrator can set program for notification when any user has achieved particular milestones, i.e. user has entered at least one song once a week for a month, or, user has sung 50 songs. This allows host to reward regulars.

ENTIRE DATABASE VIEW: Administrator can allow users to view the entire database of songs (including those the host does not have) to encourage song ordering via the net, or by notifying host of those songs most in demand.

SAMPLES: Administrator may attach song sample files to selected songs and set sample time to different configurations.

Karaoke Rental System

Referring again to FIG. 1, a minimal player (100) is incorporated into the Book to become an all in one karaoke rental system. It can be a book, a digital media storage unit for MP3 songs (120), or a simple player without disks, soundboards and other bulky equipment. It has one screen or two. The system requires, minimally a PIII computer with 800 ghz and sound/video out card, 40 GB hard disk, USB port and a touchscreen or regular computer screen with a keyboard. These are attached into a suitcase or portable case and connected to an amplifier/mixer combo which are permanently attached to a set of permanently placed wire outlets in the side of the suitcase. Up to 4 microphones, 2 external devices (200) and 2 monitors can be connected to this outer panel. 1 power switch goes into the case along with a connection for output to a Home Theatre. 1 power cord goes into the case. Inside there is a power regulator for up to 4 devises to be connected to with their own individual on/off switch. Microphone and speaker cords are stored in the suitcase cover along with microphones.

The case is hardshell of any composition and has wheels and a collapsible handle. A variation of this case allows for speakers (powered or not) to be attached to the same case, on the outside. The computer is Internet enabled to download streamed music (110) or download orders for paid songs. This ordering system is through our custom Player and storefront/shopping cart encrypted download system.

The Karaoke Rental System consists of:
The songbook in its entirety
A basic Player with Start, Stop and key change functions A basic automated queue list with screen name announcement. Option for verbal name announcement is available.

It can upload and download of encrypted digital media. Songs can be stored and played on this unit, but cannot be copied from it.

The Karaoke Rental System has a jukebox which comes in several forms, all of which can be combined by pressing an icon.

Variations include a single or dual screen industrial strength touchscreen computer. The following combo's take into consideration a dual screen system:
1. Karaoke songbook+karaoke songbook
2. Karaoke songbook+karaoke Player
3. Karaoke songbook/player+POS register
4. Music CD songbook/player+POS register
5. Video book/player+POS register There's a sound and video out-card to plug into external speaker and monitors. Hard drive sizes vary with storage needs.

The Karaoke Rental System can accept direct payment (760) by card swipe or dollar bills if unit (400) is attached to money taker.

It can be varied to play on common countertop game machines that are either plugged into a house audio system or have attached speakers and an amp as well as customized Karaoke Singing Stations that have built in speakers.

ProPlayer

ProPlayer is a player that incorporates super encryption Dongle or soft encryption, which permits "back-up" copy but can only be used with the original dongle. Features include:
1. auto/manual queue with great detail on user;
2. time of song entry, all songs entered,
3. status-box for new users,
4. box for current singer, box for entire list of users.

New users can be color coded to allow for ease of viewing and instant recognition for which users have been serviced or not.

New singers can be entered to the master list of singers automatically or manually by selecting any singer.

Once in the master list, a singer can be moved up or down manually by tapping up/down control button.

Highlighting any singer will reveal the number of songs they've chosen, with tiles and versions. These selections can be moved up and down through using an up/down control button:
1. Auto Screen announcement of next singer (and song chosen)
2. Auto screen announcement of next three singers
3. Auto play of intro music
4. Auto play of singers song
5. Auto play of outro music All songs can be started or stopped at will of Host through the Player.

It can play songs from a personal disk.

It has instant access to the Book including all Book functions from host screen, and manual entry of song selection from it.

It has instant access and download of songs from stream site or download site.

It has auto/manual song retrieval and view of current song progress from desktop. It has multi-screen view-current song, next up, current queue.

It has Audio/Video capture facility & finalize to CD/DVD when camera and extra card is attached.

It has Auto/manual music fanfare also on intro to songs and outro.

It comes preloaded with some effects while others can be loaded manually.

Video:

It can display on the monitor digitally stored media, live video feed from a camera or overlayed video combining both forms.

Using the download engine the KJ's will be able to download songs customers want while at their show.

Certain cell phones allow for our format to be downloaded to their phone from our website and in turn, to the Player. It can be expanded to all current cell phone formats. It can
1. Accept uploaded or downloaded songs from cd or outer sources.
2. Auto tag songs by comparison to database eliminating typing.
3. Encode songs into proprietary formats.
4. Save a playlist of each session.
5. Use Dongle security system or software based security system.
6. Accept songs from other media sources (710) like compact flash, sd, usb, as well as Wi-fi and Bluetooth and other unnamed devices (500) that accomplish similar delivery.
7. Verify bar codes.

Karaoke Shoppe Download Centre

Karaoke Shoppe Download Centre consists of a basic computer system consisting of hard disk, modem & ethernet, 1.8 ghz (or above) 512 m ram, 15-17"screen usually flat panel, Ultimate book software and Burner software. It can access our on-line database or comes pre-loaded with encrypted songs to save download time for the out of the way places that don't have high speed internet. It includes Dealer ID for each song. It is available as full service center with its own credit card swipe, built-in burner, multi-media ports for compact flash, sd, usb (or other storage devices) and side printer. It is also available with the option for the Counter Clerk to control external credit card entry, cd/dvd burner & cd/dvd direct printer. It has encryption licensing software that identifies the Dealer code and allows for payment of commissions from after-market sales of trail versions.

Burning Station Kiosk

It is an attractive durable kiosk that can be used in major retail outlets to service mass marketing purchases of Karaoke, video, music & text files or other digital media for burning or download onto an external device as well as be a multi-use terminal to perform additional functions such as order coffee or other goods, or perform pas services. It is either counter-top or stand-alone Kiosks. It can contain and deliver cd/dvds. It consists of a computer system that can access our on-line database or come pre-loaded with encrypted songs to save download time for the out of the way places that don't have high speed interne. The computer system consists of hard disk, modem & ethernet, 1.8 ghz (or above) 512 m ram, 15-17"screen (usually flat panel) or touchscreen. Special Burner & Printer bums titles directly onto cd/dvd, normal burner and label printer. Record of each song printed/downloaded. It can encrypt Dealer ID with each song for secure payments of trial copies paid for.

Downloadable Karaoke CD+G Player

It is quality karaoke player that doesn't require a special piece of hardware (other than a personal computer) that can download and play karaoke songs and be given away for free. It is designed as an easy to use Downloadable Player. There are two versions:

Entry Level Free Player:

It has a special encryption engine, auto access to storefront and shopping cart, personalized ID assigned to downloads, transferable time-based trial copies, queue list and player. It can limit number of songs in library.

Personal Player:

It is intended for libraries of over 50 songs. It costs a little and allows key change and has some features like recording and echo/reverb, key pitch change. It includes encryption software.

Video Library Pro

It is an adaptation of the Book and ProPlayer above designed for video professionals. Video is shot on a camera, wirelessly (or hardwire ethernet connected) transmitted to a server, captured and mounted in the Player window as a New clip. That new clip is automatically placed in a queue with a mini frame (still or active) of the content. It is ready for immediate transfer and editing. It has features including slow motion, frame by frame, and frame grab with limited editing abilities. It is time stamped and can have other notations entered by touchscreen or normal keyboard. It can manually be placed in another location in the queue. Viewing of it is instantly accessible by anyone on the network. It is designed to be a useful tool for film industry professionals who need instant review of shots just taken. It is designed for any digital camera, any wireless signal or high speed network, any computer capable of storing and playing digital content. Speed and accessibility will vary with computer power.

Universal Player

The player conducts the following functions with digital files:

multi-layered access, search, select, list, adjust, sample, save by personal name, save by category, send wirelessly, receive selection, place selection, move selection, view selection, mark selection with color code, play digital selection, pause, stop, fast forward, reverse, fast reverse, add effect to selection, re-verb, echo, harmonize, remember selection settings, sense new song, auto play intro music, sense song ending, auto-play outro music, display next singer and song, display next three singers, display ads, auto-play new song, match and auto play words of new song, match and auto play music of new song, match and auto play video and or sound to text, store multi-layered file format, play multi-layered file format, create multi-layered file format, create/store and display watermark and file ownership, display video, display video overlay, display video special effects, bum selection to dvd with or without encryption, bum selection to cd with or without encryption, burn/record selection to external device with or without encryption, auto-type entry, auto encode entry, adjust and set EQ on current selection, enter password by touchscreen, enter password by fingerprint ID, download encrypted selection to system, download encrypted selection to device.

File-Plug-In-Player

File format maintains Digital Rights management for streaming, download, viewing, sharing. It tags file functions and add-ons such as video and text, sensory and other function activation. It is used in entertainment environment usages for playing digital files like movies, music, karaoke and games.

The Player (600) identifies the multi-layered file, reads its content and is the engine that interprets and translates the data the file is carrying and performs it through an appropriate channel. The Plug-in engine permits add-on function to anyone application and permits it to grow, by user selection, into multi-purpose or higher grade uses of the original application. Example of all the above: a music file is downloaded into the Player. The file format has allowed it to be encrypted so that it can't be easily copied and has recorded into it information that identifies the file owner and the fact that a royalty has been paid on it. A plug-in is added on to the player that permits reverb special effects so now the file can be played with reverb.

DRM and Licensing Encryption Engine

Each "Player" has a user ID. The Player accesses an internet storefront to order media. The storefront checks the Player ID and okays the purchase. That okay is forwarded to a content server; content server verifies order with storefront and sends file to Player. It verifies that Player received the content and sends verification to storefront. The content that is now on the Player is unique to that player in that it has its own ID (Player) and it has a storefront ID/content delivery ID. This content can be transferred to another computer (as a trail version) but will only stay on it for a set amount of time. It has a special timer that does not use the computer clock as the only marker of trial period. It uses an internal clock in the program to estimate total number of hours used to defeat those who would abuse the trial period by setting their clocks back. It also will not transfer a trial copy to a computer that its content has been transferred to before and trial version expired. This licensing can be adapted to allowing for multiple licenses of the same music for multiple locations.

The other is from the "Double-Barreled" software encryption that is built into each of the players.

This form of encryption applies to cd's manufactured en mass at a production facility as opposed to downloaded products.

The DRM and pre-assigned license are embedded in each song on the cd with a special program that prevents copy of the cd without registration of the songs online.

If copying of the content is attempted a screen appears requiring user name and ID to be verified online.

If interne is not available a 3 day trial is assigned to the content to allow for registration. During this time and after registration occurs user may play these songs on their computer with an included Free Player. If the user already has a Player, they may use that ID.

If the songs aren't registered in the given time the content disappears. However, the content may at all times be played on a dvd or cd player from the cd. Manufacturers may elect what format for the cd files to be in, i.e., vcd, cd+g, way, mov, etc. Ultimately, the Player will convert them eventually to encrypted file formats that will only work with the Player.

All the components together make the Home Entertainment Center. Book & ProPlayer categorize and store digital media; CD's, Karaoke, Movies & Photos. ProP layer controls and plays them.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

There is variation of the invention which can be used in education; a book can be sold in digital format and be activated for just a semester or permanently. Special lectures, videos or other supplementary files can be added onto it. This application can be expanded to training modules, in medicine, a.i, mechanics, robotics. Because of the sensory-supportive nature of the file structure and Player imbedded functions in the files can be used to sense environments and respond with follow-up actions.

The operation of the variation can be explained as below:
1. A file operating system (engine) comprising:
    file identification sensor
    file plug-in activation
    file alignment with system file
    playback of joined file It is a system file comprised of multi-layered compartments capable of programmable multifunctions similar, but not limited to text to audio or video files, audio-visual to text, activation/deactivation, watermarking, encryption, DRM
2. A means to browse, search, navigate, order, download, license, encrypt, store, enjoin (synch), playback digital files of all formats
3. A means to add, build and improve product to play on numerous platforms by adding plug-ins.

In addition to the analog audio signal sources, (such as phonographs, audio tapes, and microphones, etc.), the preferred embodiment of the present invention is adapted to accept digital signals directly from any resource.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. A karaoke entertainment system comprising:
    a host player comprising an accessible database of songs;
    at least one external user device comprising an entry screen for selecting a song from the database of songs, the at least one external user device being configured to wirelessly deliver the song selection to the host player;
    a media port for receiving data from a portable storage device, the data comprising song information for playback by the host player; and
    a file-plug-in player comprising a file identification sensor, a file plug-in activation device, and a file playback device,
    wherein the file plug-in activation device configured to permit a plurality of add-on functions to be added to an audio file, the add-on functions including a plurality of media effects and digital rights management, the media effects comprising one or more of closed-captioning and pre-programmed visual effects
    the file playback device is configured to playback an audio file contained in the song information along with the media effects that have been added to the audio file by the file-plug-in player, and
    the file plug-in activation device is configured to provide a unique code to the data downloaded to the media port, the unique code being used to confirm access rights to play the song information in the data and create a limited use version of the data, the file plug-in activation device being further configured to add a timer to the data that establishes a trial period in which the file playback device can playback the audio file contained in the song information, and
    wherein the at least one external user device comprises a cell phone device.

2. The system of claim 1, wherein the at least one external user device comprises a touchscreen computer.

3. The system of claim 2, wherein the entry screen of the at least one external user device is configured to allow the user to search the database of songs by artist and song title in a scrollable manner.

4. The system of claim 1, wherein the at least one external user device is configured to display a sign-in screen, the sign-in screen being configured to receive a user name to associate with the song selection of the user.

5. The system of claim 4, wherein the system comprises a storage medium to save the user name and a password associated with the user name, and
    one or more songs selected by the user from the database of songs can be saved to the storage medium and associated with the user name for subsequent retrieval.

6. The system of claim 1, further comprising a direct payment means for receiving a credit card or money payment for purchasing songs from the database of songs.

7. The system of claim 1, wherein the other media effects comprise one or more of closed-captioning and pre-programmed visual effects.

8. A method of providing karaoke entertainment comprising:
    displaying on at least one user device a plurality of songs that can be selected by one or more users;

wirelessly receiving at a host player a plurality of song selections made by the one or more users along with a unique user identification from the at least one user device, the unique user identification including identification information associated with the one or more users;

playing the plurality of song selections at the host player;

prompting the one or more users to provide data to the one or more user device via a media port;

receiving data via the media port;

activating a file-plug-in player to identify a format file ending of the data;

joining the data with other media effects and digital rights management, the data being joined in a multi-layered file, the other media effects comprise one or more of closed-captioning and pre-programmed visual effects;

providing unique coded content to each multi-layered file, confirming access rights to play the multi-layered file by reviewing the unique coded content and limiting the use of the multi-layered file by adding a timer to the multi-layered file that establishes a trial period;

playing the joined data with other media effects in a synchronous manner if the trial period has not yet expired; and wherein the at least one user device comprises a cell phone device.

9. The method of claim 8, wherein the user device comprises at least one touchscreen computer and the act of displaying the plurality of songs comprises allowing the one or more users to search the plurality of songs by artist and song title in a scrollable manner.

10. The method of claim 8, further comprising prompting the one or more users to enter a user name to associate with the song selection of the user.

11. The method of claim 10, further comprising prompting the one or more users to enter a password along with the user name, wherein the one or more users can access their song selections at a later time using the user name and password.

12. The method of claim 8, wherein the at least one user device is configured to receive a credit card or money payment for purchasing songs from the database of songs, the method further comprising the act of requesting that the one or more users make a payment using the user device.

13. The method of claim 8, further comprising displaying ads on the user device between songs.

14. The method of claim 8, further comprising providing award notifications when the one or more users achieve one or more pre-determined milestones.

15. The method of claim 14, wherein the one or more milestones include a milestone for reaching a pre-determined number of songs.

* * * * *